Nov. 15, 1949     L. B. SCHRYNER     2,488,334
FLUID HOLDING DEVICE FOR CLEANING
SLATS OF VENETIAN BLINDS
Filed Nov. 20, 1944
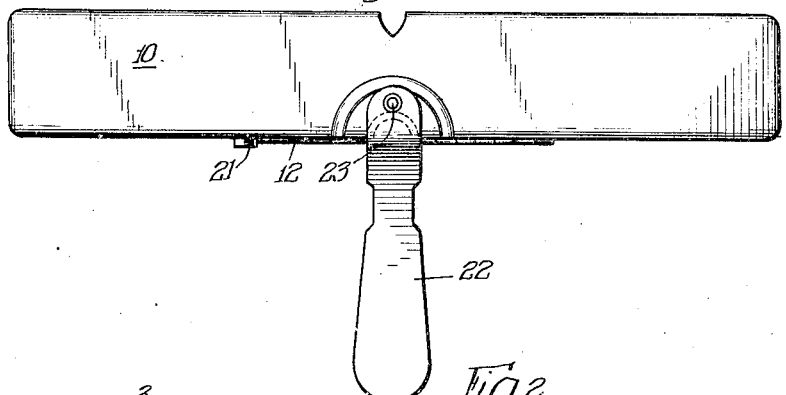
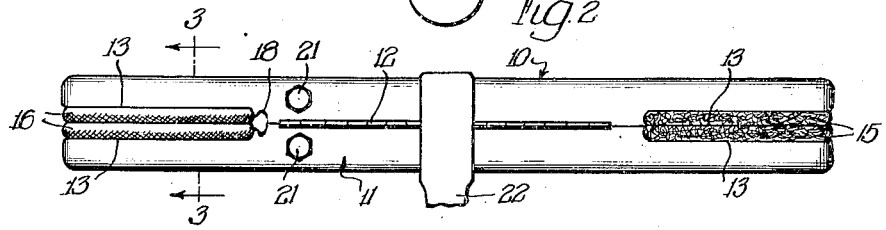
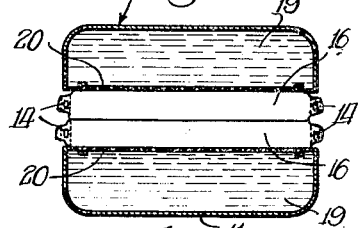
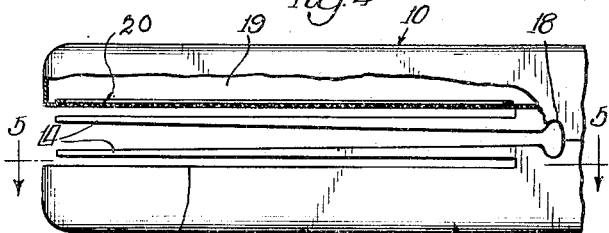
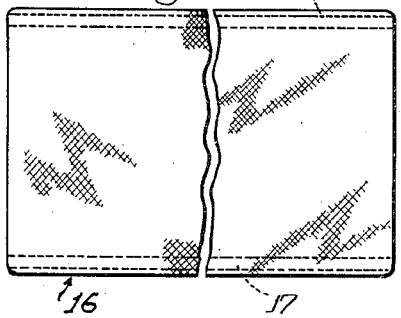
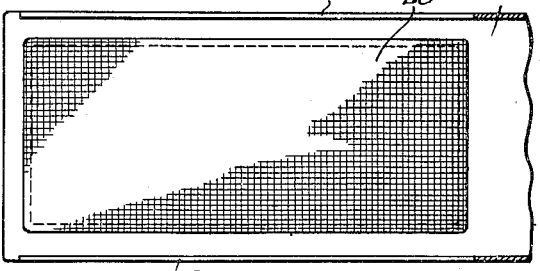
INVENTOR.
Lambert B. Schryner,
BY
attij.

Patented Nov. 15, 1949

2,488,334

UNITED STATES PATENT OFFICE 2,488,334

FLUID HOLDING DEVICE FOR CLEANING SLATS OF VENETIAN BLINDS

Lambert B. Schryner, Chicago, Ill.

Application November 20, 1944, Serial No. 564,286

4 Claims. (Cl. 15—124)

My invention relates to a device for cleaning and polishing the slats of Venetian blinds, especially while they are in suspended or applied position; the device being adapted to simultaneously clean both sides of the slats.

My improved device, as disclosed in the drawing and more specifically stated, involves a pair of superposed, parallelly arranged elongated main body members of substantially similar construction, kerfed at their outer ends on their opposing faces to receive suitable cleaning pads at one end and buffing pads at the other end and to also permit the ends to straddle and receive the blind slats therebetween; with the cleaning ends of the body members preferably chambered to receive a suitable cleaning fluid adapted to filter through the cleaning pads. The device preferably is provided with a suitable hand grasping portion or handle secured adjacent one of the longitudinal sides of the device and extending outwardly therefrom; while the two body members are yieldably held in superposed relation to readily permit insertion of the blind-slats and also permit separation for proper access to the respective pads.

The invention and its object and advantages will all be readily comprehended from the following detailed description of the accompanying drawing wherein—

Figure 1 is a top plan view of my improved device.

Figure 2 is a side elevation thereof with a portion of the handle broken away.

Figure 3 is a cross sectional view taken on the line 3—3 of Figure 2 looking in the direction of the arrows.

Figure 4 is an enlarged side elevation of the left hand end of the device illustrated in Figure 2, with a portion of one section broken away and shown in section and with the cleaning pads removed.

Figure 5 is a plan view of the lower body section as viewed along the line 5—5 of Figure 4.

Figure 6 is a plan view of one of the cleaning pads, with an intermediate portion broken away.

In the particular exemplification of the invention, the device—which may be made of wood, plastic composition, metal, or any suitable rigid material—consists of a pair of substantially similar elongated sections or body members 10, 11, arranged in superposed parallel relation and yieldably held in position by a suitable spring hinge indicated at 12, arranged along one of the longitudinal sides of the device, intermediate the ends and terminating a distance removed from the ends as shown in Figures 1 and 2; the spring hinge normally maintaining the two members in juxtaposed or face-to-face relation.

The opposing faces of both members 10 and 11, at the ends of the device, are each kerfed or recessed as shown at 13, to provide a comparatively wide blind-slat receiving slot therebetween which extends inwardly a predetermined distance commensurate with the usual width of Venetian blind slats.

The kerfs in the opposing faces of both members are formed so as to provide the longitudinally disposed prongs 14, which at their inner ends are integral with the body portions of the members 10 and 11, with the prongs 14 slightly spaced from the adjacent faces of the respective members and the prongs of member 10 spaced from the prongs of member 11.

Each member 10 and 11 is provided with a pair of prongs 14 arranged adjacent the longitudinal sides of each member and hence the prongs 14 of each member are laterally spaced apart for the purpose hereinafter described.

In the particular embodiment of the invention shown in the drawing, the prongs are merely shown at the left hand end of the device, which is intended to constitute the slat cleaning end, while the right hand end of the device constitutes the buffing or polishing end and hence the opposing faces of the members 10 and 11 at this end are shown provided with suitable pads—such as lamb's wool—shown at 15, 15, which may be cemented directly to the faces of members 10 and 11, in which instance the prongs 14 may be omitted. The pads 15 may be so cemented or secured in place that they can be easily removed for cleaning or renewal, which, however, may not be frequently necessary when merely used for polishing purposes.

The pair of prongs 14 of each member 10 and 11 are intended to receive a cleaning pad 16, shown in detail in Figure 6, composed of suitable moisture absorbing material, for example felt, cellulose paper composition or other fabric. These pads are of length commensurate with the length of the prongs and are provided along their longitudinal edges with hems as shown at 17, 17, open at the ends and adapted to receive the two laterally spaced prongs 14, 14. In other words, the pads 16 are slipped lengthwisely on the prongs; with the hems 17 so arranged that the pads will be held taut. As these pads are intended to be provided with a suitable cleaning fluid for the purpose of cleaning the blind slats, they are preferably removably secured in place to permit them to be cleaned or renewed. I contemplate making these pads of comparatively inexpensive material which will permit the soiled pads to be discarded and new pads to be employed.

To enable proper access and cleaning of the blind slat on the outer edges adjacent the routing or cord holes, the slots at the cleaning end of the members preferably are made arcuate and somewhat enlarged as shown at 18 in Figure 4.

The slat cleaning ends of the members 10 and 11, namely the left hand end of the device illustrated in the drawing, are formed to provide cleaning fluid holding chambers as shown at 19, 19, preferably extending throughout the lengths of the pad receiving slots or recessed portions of the members 10 and 11. The slot facing side of the chamber of each member is shown provided with an elongated opening provided with a fine mesh screen 20 removably secured in place in any suitable manner, thus providing access to the chambers for the purpose of cleaning and removing cleaning fluid sediment that may be deposited therein. One of the longitudinal side walls of the chambers is provided with an inlet opening having a suitable removable closure member as shown at 21 in Figure 2.

As the device is made to straddle a slat and to fit between said slat and the adjacent slats it is advisable to provide smooth or uninterrupted surfaces on the sides of the device which are disposed to the adjacent slats in order that the device may have free movement lengthwisely of the slats, I therefore provide the cleaning fluid introducing openings on one of the longitudinal sides of each member, as for example on the hinged side of the device as shown in Figure 2.

The device preferably is provided with a suitable handle 22 which is pivotally secured at 23 to one of the members, for example to the member 10; the handle extending laterally outward from the device and preferably at a declining angle.

In order to permit the members 10 and 11 to be forced apart against the action of the spring hinge 12, the handle 22 is merely secured to one of the members; the members being yieldingly secured together to accommodate the slat to be cleaned and also to permit access to the removable perforated chamber wall or screen 20 when occasion arises as heretofore mentioned.

As is apparent, the device is adapted to simultaneously clean and polish both sides of a slat by proper reciprocatory movements of the device; the particular exemplification being adapted to clean and polish the upper and the lower surfaces of a single slat during one operation; it being understood that after the slat has been cleaned, by holding the device at an angle to the blind and edgewisely applying the cleaning fluid holding end of the device to a slat, the opposite or buffing end of the device is then applied by reversing the angularity of the device relative to the slat so as to permit the slat to enter the buffer-pad holding slotway; the number of slats that may be simultaneously cleaned being determined by the number of slotways arranged in the ends of the device, as can readily be understood.

I have shown what I believe to be the best embodiment of my invention, but structural modifications are possible and may be made without, however, departing from the spirit of my invention as defined in the appended claims.

What I claim is:

1. A Venetian blind slat cleaning device comprising an elongated rigid body composed of a pair of superposed sections yieldably secured together, each section at an end being kerfed to provide a blind-slat receiving slot between the sections; said end of each section being provided with laterally spaced prongs secured at their inner ends to their respective sections and disposed lengthwisely of the slots; and pads of yieldable material removably mounted on the prongs.

2. A Venetian blind slat cleaning device comprising a rigid body composed of a pair of superposed elongated sections yieldably secured together, each section at an end being kerfed to provide a blind-slat receiving slot between the sections, at least one of the sections being chambered to receive a cleaning fluid with the slot facing wall of the chamber having perforations to permit the cleaning fluid to percolate into the slot; pads of yieldable moisture absorbing material arranged lengthwisely in the slot adjacent each slot facing wall; and means whereby the pads are removably secured in place.

3. A Venetian blind slat cleaning device comprising a rigid elongated body composed of a pair of superposed sections hingedly secured together, the sections at an end being formed to provide a slat receiving slot disposed lengthwise of the body between the sections, the body at one end being provided with a fluid holding chamber having a slot facing perforated wall; prongs disposed lengthwisely of one of said slots adjacent said perforated wall and integral at their inner ends with the body; slat cleaning absorbent material formed so as to be slid onto said prongs and to be held against said perforated wall; means whereby the sections are yieldably held in superposed relation; and a handle secured to the body intermediate its ends.

4. A Venetian blind slat cleaning device comprising a rigid elongated body composed of a pair of superposed similar sections arranged in superposed relation, the sections on their opposing faces and at an end being recessed to provide a slat receiving slot, the sections within the slot being provided with prongs disposed lengthwisely of the recesses and integral at their inner ends with the respective section, at least one end of each section being provided with a fluid holding chamber having a perforated wall facing said slot; fabric pads formed to slide lengthwisely onto the respective prongs and thereby to be held in contact with the perforated wall; means whereby the sections are yieldably secured in superposed relation; and a handle secured to one of said sections intermediate its ends and disposed laterally from the body.

LAMBERT B. SCHRYNER.

REFERENCES CITED

The following references are of record in the file of this patent:

UNITED STATES PATENTS

| Number | Name | Date |
|---|---|---|
| 681,425 | Tyre | Aug. 27, 1901 |
| 2,178,849 | Breuer | Nov. 7, 1939 |
| 2,276,078 | Marks et al. | Mar. 10, 1942 |